United States Patent [19]

Macchi

[11] 4,226,176
[45] Oct. 7, 1980

[54] BREAD TOASTER

[76] Inventor: Giannino Macchi, Via Zini n. 13, Tradate (Varese), Italy

[21] Appl. No.: 34,941

[22] Filed: May 1, 1979

[51] Int. Cl.³ ............................................. A47J 37/08
[52] U.S. Cl. ......................................... 99/335; 99/387; 99/389; 198/728
[58] Field of Search ...................... 99/386, 387, 443 L, 99/389, 335, 338; 198/728

[56] References Cited

U.S. PATENT DOCUMENTS

| | | | |
|---|---|---|---|
| 2,151,401 | 3/1939 | Belcher | 99/387 |
| 2,182,229 | 12/1939 | Hamel | 99/386 |
| 2,714,348 | 8/1955 | Fokakis | 99/387 |
| 2,783,890 | 3/1957 | Harlan | 198/728 |
| 3,487,770 | 1/1970 | Svensson | 99/387 |

FOREIGN PATENT DOCUMENTS 576277  4/1958  Italy ............................................ 99/386

*Primary Examiner*—Billy J. Wilhite
*Attorney, Agent, or Firm*—Young & Thompson

[57] ABSTRACT

Bread is toasted by being moved by a conveyor, in upright position, between a plurality of radiant heating elements. The conveyor is provided with vertically spaced metal endless belts that carry between them pusher members. The bread is fed toward the conveyor by a spring-urged feeder, whereby slices of bread are removed one by one from the stacked series of slices by the pushers on the conveyor.

5 Claims, 5 Drawing Figures

BREAD TOASTER

The present invention relates to automatic bread toasters.

In the past, bread toasters have ordinarily been of the type in which electric heating resistors are disposed in a box having slots that open through the top of the box, the slices of bread being inserted in the slots and lowered for toasting between the heaters.

The present invention differs from known bread toasters, principally in that the bread slices are moved automatically and seriatim, along a conveying path which passes between radiant electric heaters.

The present invention is thus characterized by speed and ease of operation, and suitability for use in any number of environments, such as the home, commercial establishments, etc.

Other features and advantages of the present invention will become apparent from a consideration of the following description, taken in connection with the accompanying drawings, in which.

Figure 2:
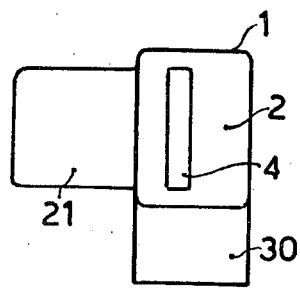
FIG. 2 is an end elevational view thereof from the right of FIG. 1.

Referring now to the drawings in greater detail, there is shown a toaster according to the present invention comprising a housing 1 which is generally elongated in a direction parallel to the path of the bread through the toaster, and is closed by two ends 2 and 3. End 2 has a vertical slot 4 therethrough, for exit of the toasted bread slices. Adjacent the other end, there is an inlet opening 5 for bread slices to be toasted.

Disposed within housing 1 is a pair of superposed parallel horizontal endless metal conveyor belts 6 and 7 supported at one end by ceramic drive pulleys 9, 9' and at the other end by ceramic idle pulleys 10, 10'. Pulleys 9 and 9' are coaxial and driven by electric motor 12 via speed-reduction unit 13. Pulleys 10 and 10' are mounted on a common idler shaft. The axes of the two parallel shafts that bear the pulleys are vertical and parallel to each other and disposed one adjacent each end of the housing 1.

The belts 6 and 7 are interconnected by a plurality of vertical pushers or cross flights 15, of L-shaped cross-sectional configuration, which are spaced apart a distance greater than the greatest dimension of a slice of bread to be toasted. The flights 15 not only secure together and reinforce the assembly of belts 6 and 7, but also serve as pushers for individually advancing the slices of bread during toasting. For this purpose, the height of each flight above the belts 6, 7 is a little less than the thickness of the bread slices to be toasted.

Figure 4:
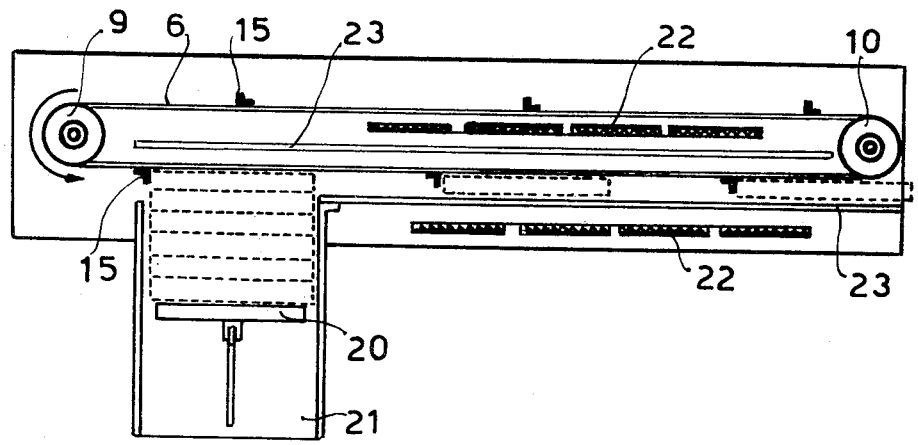
FIG. 4 is an enlarged top view in cross section.

The opening 5 is provided with a generally upwardly open bracket 21 that extends outwardly therefrom and which forms a trough for retaining and feeding the slices of bread. Bracket 21 is of generally U-shaped configuration. A feeder 21 is slidably mounted for movement on and relative to bracket 21 and is urged toward the interior of housing 1 by a spring 20' disposed beneath bracket 21. The feeder 20 can thus be pulled back manually against the action of spring 20', and a number of slices of bread placed as shown in FIG. 4 in dotted line, in a horizontally extending stack in which the slices are all vertically disposed, after which release of the feeder 20 urges the slices of bread toward the conveyor to be picked up one by one by the flights 15 thereon.

Eight electric resistance heating elements 22 are provided, four on each side of the path followed by the bread under the impetus of conveyor 6, 7. The feeding elements are of course vertically disposed. The path of the bread between the heating elements is defined, on one side, by the belts 6, 7, and on the other side by a plurality of vertically spaced horizontal slender rods 23. The open spaces between the rods 23 and the belts 6 and 7, is so great that these belts and rods do not perform any important masking of the radiant heat from the heating elements 22, whereby they do not substantially interfere with the toasting of the bread. Naturally, the belts 6, 7 and the rods 23 are made so slender as substantially to avoid horizontal white bands on the toasted bread.

Figure 1:
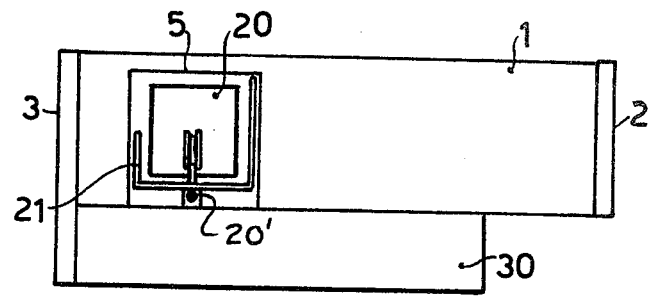
FIG. 1 is a front side elevational view of a toaster according to the present invention.
Figure 3:
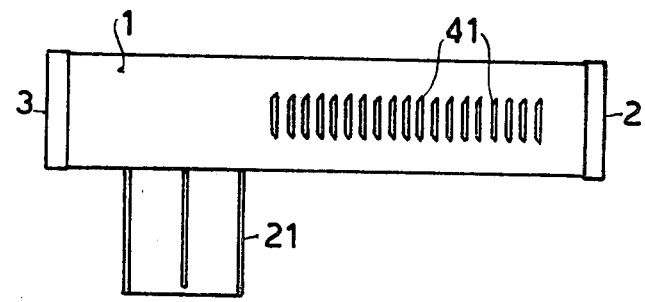
FIG. 3 is a top plan view thereof.
Figure 5:
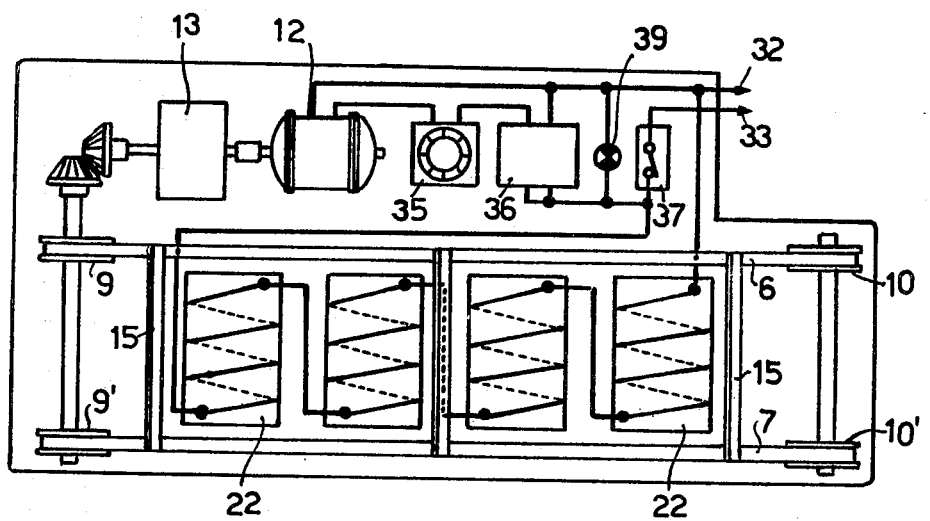
FIG. 5 is a somewhat schematic enlarged side elevational view thereof in section.

As seen in FIGS. 1 and 2, the drive and controls for the toaster are housed in a casing 30 attached to the bottom of housing 1. In FIG. 5, the casing 30 is shown diagrammatically above the housing 1; but this is only for purposes of diagrammatic illustration of the invention and does not represent the actual physical arrangement of the parts. In fact, however, it is immaterial whether casing 30 is above or below housing 1; but below housing 1 is preferred. In any event, disposed within casing 30 are a voltage regulator 35, a time delay 36, a switch 37, and an indicator lamp 39 which tells whether the switch 37 is open or closed. These elements of the electric circuit are disposed in series or parallel with the motor 12, as shown, between the mains 32, 33, in a conventional manner, so that motor 12 receives the proper voltage after a time delay due to time delay 36. Thus, when switch 37 is closed, lamp 39 is lit and the heating elements 22 begin to heat up. After the lapse of a predetermined period of time such that the heating elements are fully heated, then time delay 36 permits motor 12 to operate to move the slices of bread in series between the fully heated heating elements 22.

Vents 41, to prevent overheating within housing 1, are provided; while similar vents (not shown) are provided on the underside of the device for the same purpose.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. An automatic toaster comprising, in combination, an elongated horizontal parallelepipedal housing, said housing having adjacent one end thereof an opening for the introduction of bread slices to be toasted and adjacent the other end thereof an opening for the exit of toasted bread slices, means to insert automatically and one by one the bread slices to be toasted into said housing through the first opening from a stack of bread slices, two vertically spaced horizontal endless metal conveyor members disposed in the housing, rolls in the housing adjacent opposite ends of the housing about which said conveyor members circulate, said first opening being positioned so as to feed bread slices to said conveyor members at a location between said rolls an electric motor for driving one of said rolls in rotation to circulate said endless conveyor members, cross members on the endless conveyor members and interconnecting the endless conveyor members to push bread slices lengthwise along the housing from the first opening to the second opening, electric resistance heating means for heating the bread slices conveyed by said conveyor members, fixed guide means to hold the bread slices out of contact with the electric resistance heating means and to position the bread slices along their path of movement from the first opening to the second opening, and time delay means for heating said heating means for a predetermined period of time prior to actuation of said motor.

2. A toaster as claimed in claim 1, said cross members comprising members that are L-shaped in cross section having a base secured to the conveyor members and an upstanding portion that contacts and pushes said bread slices, said base being on the side of said upstanding portion which is opposite the side of said upstanding portion that contacts said bread slices.

3. A toaster as claimed in claim 1, said guide means comprising vertically spaced apart horizontal members extending lengthwise of said housing and disposed between said electric heating means and said endless conveyor members, said cross members extending away from said endless conveyor members toward said guide means.

4. A toaster as claimed in claim 1, said means for automatically inserting said bread slices comprising a bracket in the form of an upwardly open trough to receive a stack of bread slices on edge in upright position with said bread slices parallel to the run of said endless conveyor members along which said bread slices are to be conveyed, said trough extending outwardly from said housing adjacent one end of the housing in a direction perpendicular to the length of the housing, and a spring-urged member that urges said stack of bread slices toward said conveyor members.

5. A toaster as claimed in claim 1, said time-delay means comprising a manually operable switch for initiating actuation of the toaster, and in circuit with said manually operable switch a time-delay switch for actuating said motor after the lapse of a predetermined period of time.

* * * * *